United States Patent
Saini et al.

(10) Patent No.: US 12,363,529 B2
(45) Date of Patent: Jul. 15, 2025

(54) SECURE ENERGY HARVEST SYSTEM

(71) Applicant: Cisco Technology, Inc., San Jose, CA (US)

(72) Inventors: Vinay Saini, Bengaluru (IN); Ram Mohan Ravindranath, Bangalore (IN); Jerome Henry, Pittsboro, NC (US); Nagendra Kumar Nainar, Morrisville, NC (US)

(73) Assignee: Cisco Technology, Inc., San Jose, CA (US)

(*) Notice: Subject to any disclaimer, the term of this patent is extended or adjusted under 35 U.S.C. 154(b) by 276 days.

(21) Appl. No.: 18/302,651

(22) Filed: Apr. 18, 2023

(65) Prior Publication Data

US 2024/0357348 A1    Oct. 24, 2024

(51) Int. Cl.
*H04L 29/06* (2006.01)
*H02J 50/00* (2016.01)
*H02J 50/20* (2016.01)
*H04W 12/06* (2021.01)

(52) U.S. Cl.
CPC ........... *H04W 12/06* (2013.01); *H02J 50/001* (2020.01); *H02J 50/20* (2016.02)

(58) Field of Classification Search
None
See application file for complete search history.

(56) References Cited

U.S. PATENT DOCUMENTS

| | | | | |
|---|---|---|---|---|
| 10,223,717 | B1* | 3/2019 | Bell | H02J 50/40 |
| 10,985,617 | B1* | 4/2021 | Johnston | H02J 50/005 |
| 2012/0214418 | A1* | 8/2012 | Lee | G06F 1/3287 |
| | | | | 455/522 |
| 2013/0091565 | A1 | 4/2013 | Kafer | |
| 2013/0300204 | A1* | 11/2013 | Partovi | B60L 58/15 |
| | | | | 307/104 |
| 2014/0325218 | A1 | 10/2014 | Shimizu et al. | |
| 2015/0271673 | A1* | 9/2015 | Lord | H02J 50/20 |
| | | | | 455/411 |
| 2016/0050563 | A1* | 2/2016 | Bronk | H04L 63/062 |
| | | | | 726/7 |
| 2016/0254691 | A1 | 9/2016 | Koo et al. | |
| 2016/0359375 | A1* | 12/2016 | Lee | H02J 7/00714 |
| 2018/0121683 | A1 | 5/2018 | Goldberg et al. | |

(Continued)

OTHER PUBLICATIONS

Lomotey, Richard K.; Deters, Ralph. SaaS Authentication Middleware for Mobile Consumers of IaaS Cloud. 2013 IEEE Ninth World Congress on Services. https://ieeexplore.ieee.org/stamp/stamp.jsp?tp=&arnumber=6655734 (Year: 2013).*

(Continued)

*Primary Examiner* — Jeremiah L Avery

(74) *Attorney, Agent, or Firm* — Patterson + Sheridan, LLP

(57) ABSTRACT

The present disclosure describes a system and method for secure energy harvesting. An access point includes a memory and a processor communicatively coupled to the memory. The processor receives, from a wireless device, a token and an identifier for a first access point that generated the token and requests the first access point to validate the token. The processor also, in response to the first access point validating the token, wirelessly communicates a first charging frame to the wireless device.

20 Claims, 9 Drawing Sheets

(56) References Cited

U.S. PATENT DOCUMENTS

| | | | |
|---|---|---|---|
| 2019/0245389 A1* | 8/2019 | Johnston | H02J 50/20 |
| 2020/0006988 A1* | 1/2020 | Leabman | A61B 8/56 |
| 2021/0194528 A1 | 6/2021 | Zalewski et al. | |
| 2021/0226481 A1* | 7/2021 | Chan | H02J 50/402 |
| 2021/0281124 A1* | 9/2021 | Mars | H02J 50/40 |
| 2022/0045554 A1* | 2/2022 | Leabman | H02J 50/40 |
| 2022/0181887 A1* | 6/2022 | Baldasare | G08B 21/182 |

OTHER PUBLICATIONS

Kim, Dong-Zo et al. One-to-N wireless power transmission system based on multiple access one-way in-band communication. Proceedings of The 2012 Asia Pacific Signal and Information Processing Association Annual Summit and Conference. https://ieeexplore.ieee.org/stamp/stamp.jsp?tp=&arnumber=6412017 (Year: 2012).*

Harverinen, Henry et al. Cellular access control and charging for mobile operator wireless local area networks. IEEE Wireless Communications, vol. 9, issue: 6. https://ieeexplore.ieee.org/stamp/stamp.jsp?tp=&arnumber=1160081 (Year: 2002).*

* cited by examiner

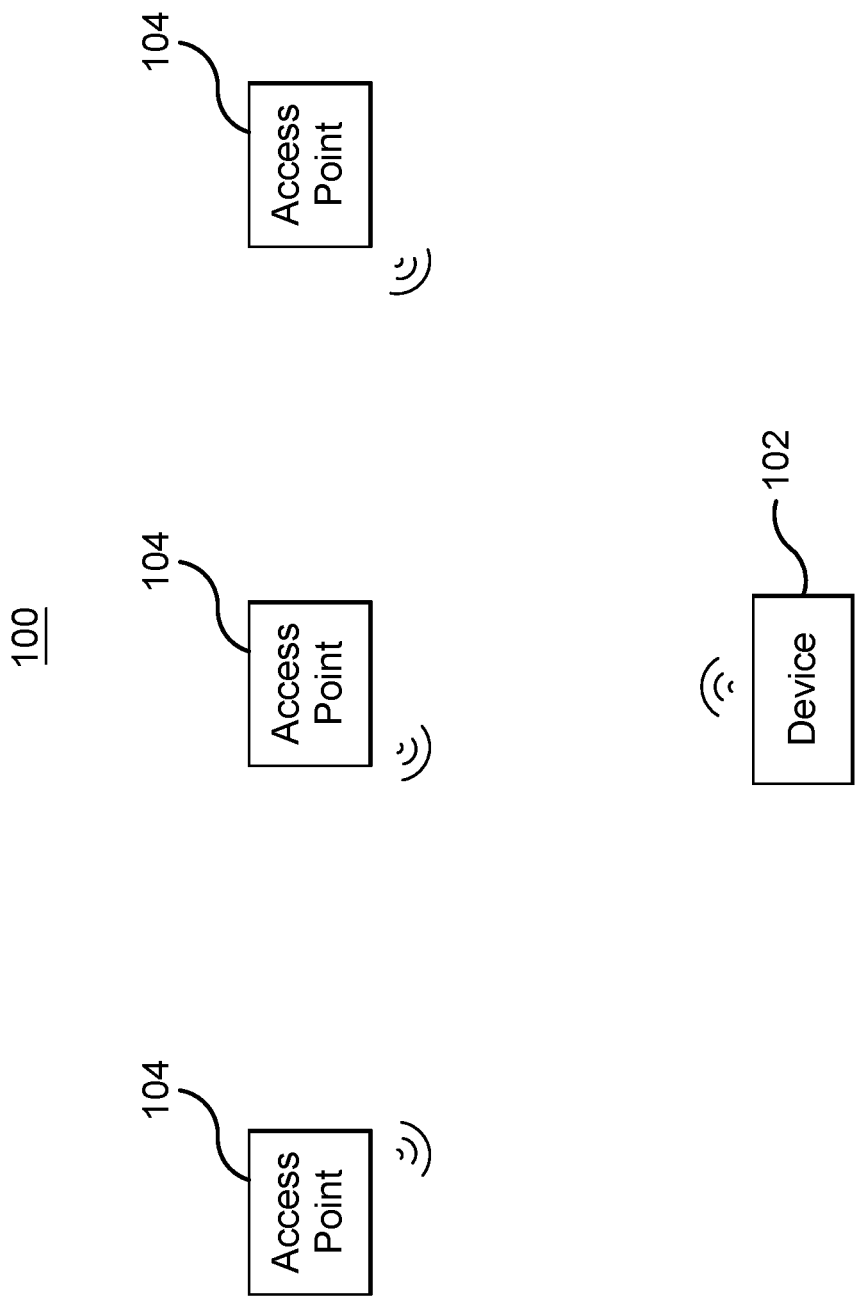

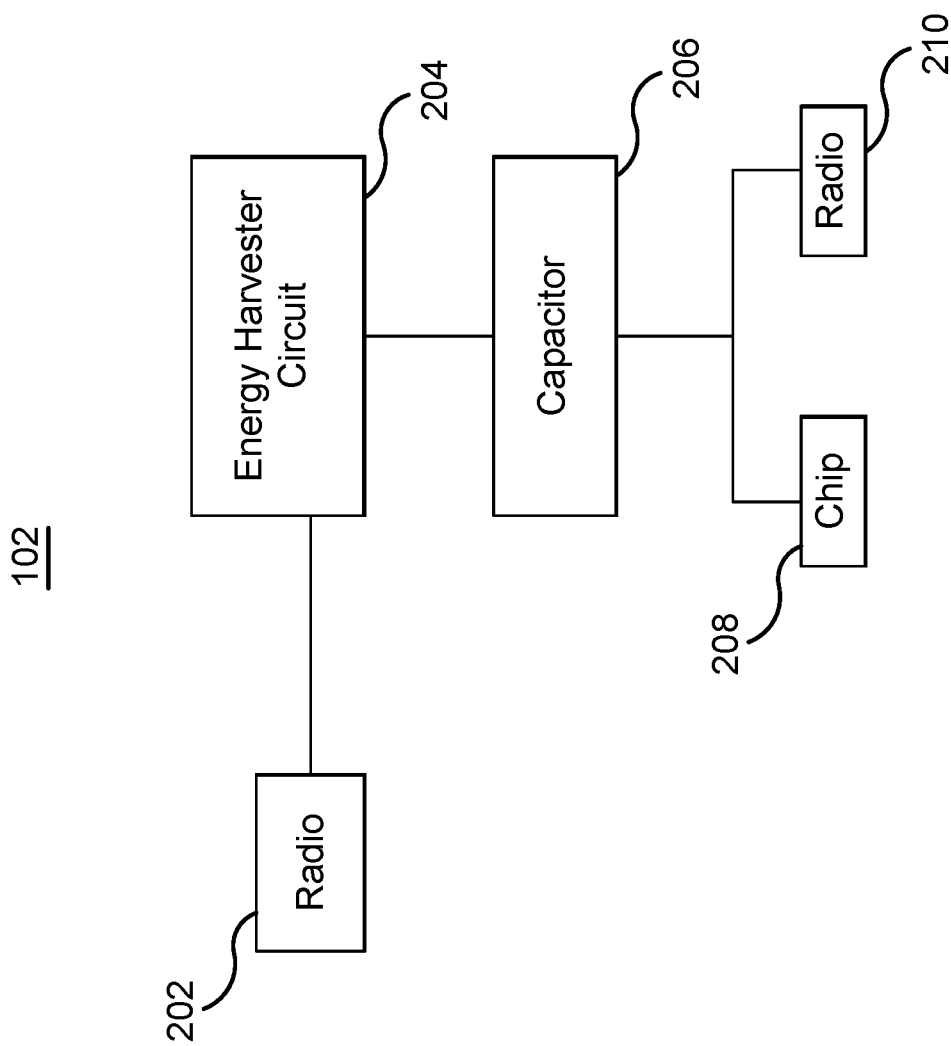

SECURE ENERGY HARVEST SYSTEM

TECHNICAL FIELD

Embodiments presented in this disclosure generally relate to wireless communication. More specifically, embodiments disclosed herein relate to a secure energy harvest system.

BACKGROUND

Devices in wireless fidelity (WiFi) networks may harvest energy from over-the-air wireless signals communicated by access points in the networks. The devices may then use this energy to generate and transmit messages.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 1 illustrates an example system.

FIGS. 2A and 2B illustrate an example device in the system of FIG. 1.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 2B:
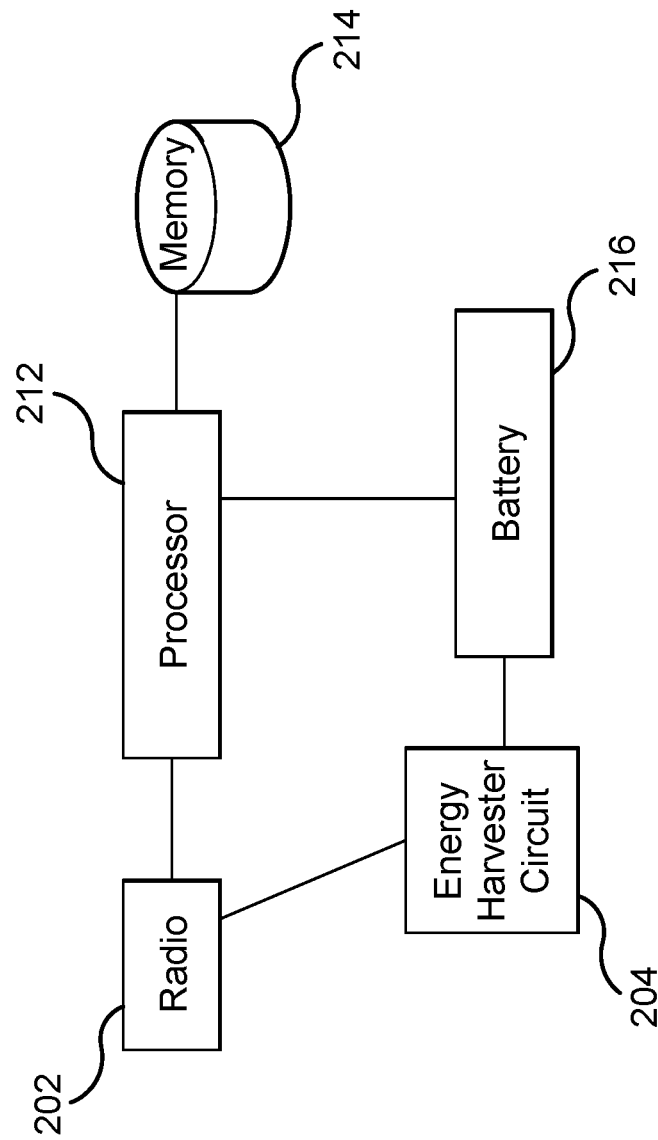

The present disclosure describes a system and method for secure energy harvesting. According to an embodiment, an access point includes a memory and a processor communicatively coupled to the memory. The processor receives, from a wireless device, a token and an identifier for a first access point that generated the token and requests the first access point to validate the token. The processor also, in response to the first access point validating the token, wirelessly communicates a first charging frame to the wireless device.

According to another embodiment, a method includes receiving, from a wireless device, a token and an identifier for a first access point that generated the token and requesting the first access point to validate the token. The method also includes, in response to the first access point validating the token, wirelessly communicating a first charging frame to the wireless device.

According to another embodiment, a system includes a first access point and a second access point. The first access point wirelessly authenticates a wireless device and communicates a token to the wireless device in response to authenticating the wireless device. The second access point wirelessly receives the token from the wireless device and communicates the token to the first access point. The second access point also, in response to the first access point validating the token, wirelessly communicates a charging frame to the wireless device.

EXAMPLE EMBODIMENTS

Devices in WiFi networks may harvest energy from over-the-air wireless signals (e.g., charging frames) communicated by access points in the networks and use this energy to generate and transmit messages. Existing network deployments may be large and may include several access points distributed across a space. Each time a device roams from one access point to another access point by moving or being moved in the space, the device may need to re-perform an association or authentication process with the new access point before the new access point may send wireless signals to charge the device. If the device is low on energy, it may be wasteful for the device to re-authenticate or re-associate merely to receive wireless charging frames.

The present disclosure describes a technique for secure energy harvesting. When a device first authenticates with a first access point in the network, the device may also indicate to the first access point that the device can harvest energy from wireless signals. The first access point may authenticate the device and provide a token to the device. When the device roams to a second access point in the network, the device may communicate the token to the second access point along with an identifier for the first access point. The second access point may communicate the token to the first access point for validation using any suitable connection (e.g., a backend wired or wireless communication path between the two access points). The first access point may validate the token (e.g., confirm that the first access point issued the token to the device) and communicate a validation indication to the second access point. In response to receiving the validation indication, the second access point may begin communicating charging frames to the device. If the device wishes to use the second access point to transmit or receive data messages, the device may perform the authentication or association procedure with the second access point.

In certain embodiments, the technique for secure energy harvesting provides several technical advantages. For example, using the technique, a device may quickly receive charging frames from any access point in a network without needing to re-authenticate or re-associate with different access points as the device roams in the network. As a result, the device conserves electrical energy and reduces memory and processor usage.

FIG. 1 illustrates an example system 100. As seen in FIG. 1, the system 100 includes a device 102 and one or more access points 104. Generally, the device 102 may authenticate or associate with one of the access points 104 in the system 100. The access point 104 may then provide charging frames to the device 102 so that the device 102 may harvest and store energy from the charging frames. In certain embodiments, the access point 104 also provides the device 102 a token that the device 102 may provide to other access points 104 in the system 100. When the device 102 provides the token to a second access point 104, the second access point 104 may validate the token with the original access point 104 that issued the token. After the token is validated, the second access point 104 may provide charging frames to the device 102 without the device 102 having to authenticate or associate with the second access point 104.

The device 102 may be an ambient power device that uses energy from wireless over-the-air signals from the access points 104 to operate. For example, the device 102 may harvest or extract energy from over-the-air wireless signals (e.g., charging frames) from the access points 104. The device 102 may store that energy in a capacitor or battery. The device 102 may then use the stored energy to perform the operations or functions of the device 102. For example, the device 102 may generate or transmit messages using the stored energy.

In some embodiments, the device 102 is a suitable device for communicating with components of the system 100 over the network 106. As an example and not by way of limitation, the device 102 may be a computer, a laptop, a wireless or cellular telephone, an electronic notebook, a personal digital assistant, a tablet, or any other device capable of receiving, processing, storing, or communicating information with other components of the system 100. The device 102 may be a wearable device such as a virtual reality or augmented reality headset, a smart watch, or smart glasses. The device 102 may also include a user interface, such as a display, a microphone, keypad, or other appropriate terminal equipment usable by the user. The device 102 may include a hardware processor, memory, or circuitry configured to perform any of the functions or actions of the device 102 described herein. For example, a software application designed using software code may be stored in the memory and executed by the processor to perform the functions of the device 102.

The device 102 may authenticate or associate with (or otherwise connect to) an access point 104 before the device 102 receives signals or messages from the access point 104. For example, when the device 102 initially connects to an access point 104, the device 102 may provide identifying credentials to the access point 104. The access point 104 may then authenticate or associate with the device 102. The access point 104 may then communicate wireless signals or messages to the device 102. For example, the access point 104 may communicate wireless charging frames to the device 102. The device 102 may harvest or extract energy from the wireless charging frames. The access point 104 may also provide the device 102 a token that the device 102 may store for subsequent use.

As the device 102 moves about the system 100, the device 102 may move closer to other access points 104 in the system 100. In these situations, the device 102 may need to communicate through the other access point 104 to maintain communication in the system 100. In existing networks, the device 102 may need to re-authenticate or re-associate with the other access point 104 before the device 102 may communicate with through that access point 104. In some instances, it may be difficult for the device 102 to perform the re-authentication or re-association process, especially if the device 102 is low or almost out of energy.

In the system 100, if the device 102 is low on energy and needs charging frames from the other access point 104, the device 102 may provide the token to the other access point 104. The other access point 104 may then validate the token with the access point 104 that issued the token. After the token is validated, the other access point 104 may begin communicating wireless charging frames to the device 102 to provide energy to the device 102. In this manner, the device 102 need not re-authenticate or re-associate with the other access point 104 before receiving charging frames from the other access point 104. As a result, the device 102 may more quickly receive charging frames, and the device 102 need not use additional energy to re-authenticate or re-associate with other access points 104.

The access points 104 may provide wireless network access to devices in the system 100. The device 102 may typically communicate through the access point 104 that is physically closest to the device 102. As discussed previously, the access points 104 may communicate wireless charging frames to the device 102 to provide energy to the device 102. In some embodiments, after the device 102 has authenticated or associated with an access point 104 in the system 100, that access point 104 may communicate wireless charging frames to the device 102. The access point 104 may also provide a token to the device 102. The device 102 may subsequently use the token to request wireless charging frames from other access points 104 in the system 100 without having to re-authenticate or re-associate with those other access points 104.

In certain embodiments, after the device 102 has authenticated or associated with an access point 104, the access point 104 may communicate data messages to the device 102 in addition to the wireless charging frames. The device 102 may also communicate data messages back to the access point 104. In some embodiments, if the device 102 has provided only the token to an access point 104, then the access point 104 may communicate only wireless charging frames to the device 102. If the device 102 wishes to communicate data messages, then the device 102 may need to re-authenticate or re-associate with that access point 104. In certain embodiments, the access points 104 may refrain from communicating wireless charging frames to the device 102 while the access points 104 are communicating data messages to the device 102.

In some embodiments, the device 102 may receive charging frames from multiple access points 104. The access points 104 may coordinate the communication of charging frames to the device 102. For example, the access points 104 may generate schedules that govern when charging frames are communicated to the device 102. The access points 104 may coordinate their schedules so that only one access point 104 is communicating charging frames to the device 102 at one time. The device 102 may listen for the charging frames from the access points 104 according to these coordinated schedules. In this manner, the access points 104 communicate wireless charging frames to the device 102 in conjunction with each other. Additionally, the device 102 may receive charging frames more frequently, even though any particular access point 104 does not transmit charging frames to the device 102 as frequently relative to when only one access point 104 communicates charging frames to the device 102.

FIG. 2A illustrates an example device 102 in the system 100 of FIG. 1. As seen in FIG. 2A, the device 102 includes a radio 202, an energy harvester circuit 204, a capacitor 206, a chip 208, and a radio 210. In particular embodiments, the device 102 uses these components to harvest and store energy from wireless over-the-air signals (e.g., charging frames). The device 102 may then use this stored energy to power the operations of the device 102 (e.g., generating and transmitting messages).

The radio 202 may receive wireless signals over-the-air. The radio 202 may include any suitable components to receive wireless signals. For example, the radio 202 may include an antenna that receives wireless signals from one or more of the access points 104. In some embodiments, these wireless signals may be charging frames sent by the access point 104 to provide energy to the device 102. The radio 202 may also transmit wireless signals.

The energy harvester circuit 204 may be a circuit connected to the radio 202 in the device 102. The energy harvester circuit 204 may include rectifiers, diodes, and other circuit components that harvest or extract energy from wireless signals received by the radio 202 of the device 102. The energy harvester circuit 204 may send the harvested energy to the capacitor 206 for storage. As the radio 202 of the device 102 receives more wireless signals from the access points 104, the energy harvester circuit 204 may harvest and store more energy in the capacitor 206. The device 102 may use the energy stored in the capacitor 206 to generate and transmit wireless signals.

When the capacitor 206 has stored a sufficient amount of energy, the device 102 may use the energy in the capacitor 206 to power the chip 208 and the radio 210. For example, the energy in the capacitor 206 may be used to operate a clock and to power the chip 208 so that the chip 208 generates signals according to the clock. The chip 208 may be an integrated circuit that includes or encodes data or information in the signals. For example, the signals may include beacons or alerts. The energy in the capacitor 206 may also power the radio 210 to transmit the signals produced by the chip 208. The radio 210 may transmit the signals wirelessly to other components in the system 100. For example, the radio 210 may transmit the signals to access points 104 in the system 100 or to other readers in the system 100.

FIG. 2B illustrates an example device 102 in the system 100 of FIG. 1. As seen in FIG. 2B, the device 102 includes the radio 202, the energy harvester circuit 204, a processor 212, a memory 214 and a battery 216. Generally, the device 102 harvests and stores energy from over-the-air wireless signals. The device 102 may then use that energy to power the operations of the device 102 (e.g., generating and transmitting messages).

As with the device 102 in the example of FIG. 2A, the device 102 in the example of FIG. 2B receives wireless over-the-air signals using the radio 202. The device 102 harvests or extracts energy from the wireless signals using the energy harvester circuit 204. The device 102 may store that energy in the battery 216. The device 102 may then use the battery 216 to power other components in the device 102, such as the processor 212 and the memory 214. The processor 212 and the memory 214 may perform the operations and functions of the device 102 described herein.

The processor 212 is any electronic circuitry, including, but not limited to one or a combination of microprocessors, microcontrollers, application specific integrated circuits (ASIC), application specific instruction set processor (ASIP), and/or state machines, that communicatively couples to memory 214 and controls the operation of the device 102. The processor 212 may be 8-bit, 16-bit, 32-bit, 64-bit or of any other suitable architecture. The processor 212 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 212 may include other hardware that operates software to control and process information. The processor 212 executes software stored on the memory 214 to perform any of the functions described herein. The processor 212 controls the operation and administration of the device 102 by processing information (e.g., information received from the access points 104 and memory 214). The processor 212 is not limited to a single processing device and may encompass multiple processing devices.

The memory 214 may store, either permanently or temporarily, data, operational software, or other information for the processor 212. The memory 214 may include any one or a combination of volatile or non-volatile local or remote devices suitable for storing information. For example, the memory 214 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 214, a disk, a CD, or a flash drive. In particular embodiments, the software may include an application executable by the processor 212 to perform one or more of the functions described herein.

Figure 3:
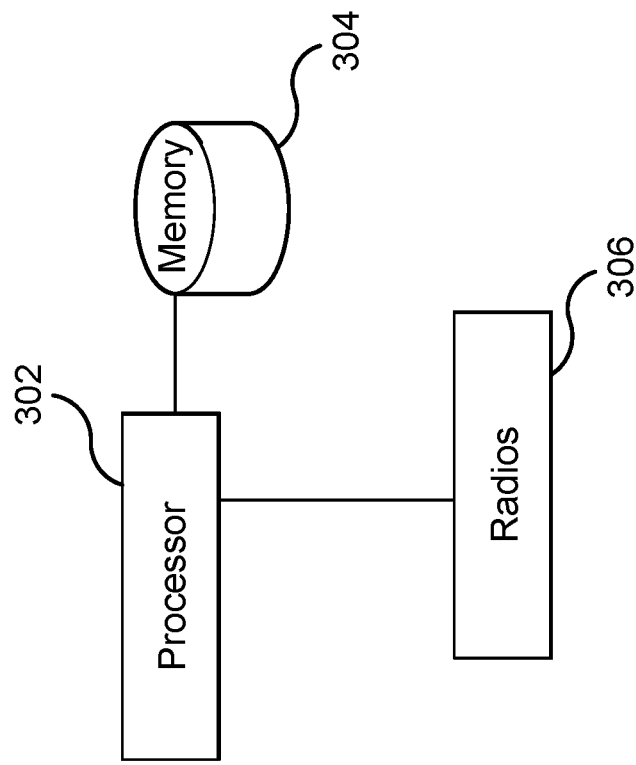
FIG. 3 illustrates an example access point in the system of FIG. 1.

FIG. 3 illustrates an example access point 104 in the system 100 of FIG. 1. As seen in FIG. 3, the access point 104 includes a processor 302, a memory 304, and one or more radios 306. Generally, the access point 104 may use these components to transmit and receive wireless signals from other components in the system 100 (e.g., the device 102 or other access points 104).

The processor 302 is any electronic circuitry, including, but not limited to one or a combination of microprocessors, microcontrollers, application specific integrated circuits (ASIC), application specific instruction set processor (ASIP), and/or state machines, that communicatively couples to memory 304 and controls the operation of the access point 104. The processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 302 may include other hardware that operates software to control and process information. The processor 302 executes software stored on the memory 304 to perform any of the functions described herein. The processor 302 controls the operation and administration of the access point 104 by processing information (e.g., information received from the device 102, access points 104, and memory 304). The processor 302 is not limited to a single processing device and may encompass multiple processing devices.

The memory 304 may store, either permanently or temporarily, data, operational software, or other information for the processor 302. The memory 304 may include any one or a combination of volatile or non-volatile local or remote devices suitable for storing information. For example, the memory 304 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 304, a disk, a CD, or a flash drive. In particular embodiments, the software may include an application executable by the processor 302 to perform one or more of the functions described herein.

The access point 104 may include any suitable number of radios 306. The access point 104 may use the radios 306 to transmit and receive messages from the device 102 or other access points 104 in the system 100. The radios 306 may include components to transmit and receive wireless signals. For example, the radios 306 may include antennas, transmitter circuits, receiver circuits, etc.

Figure 4:
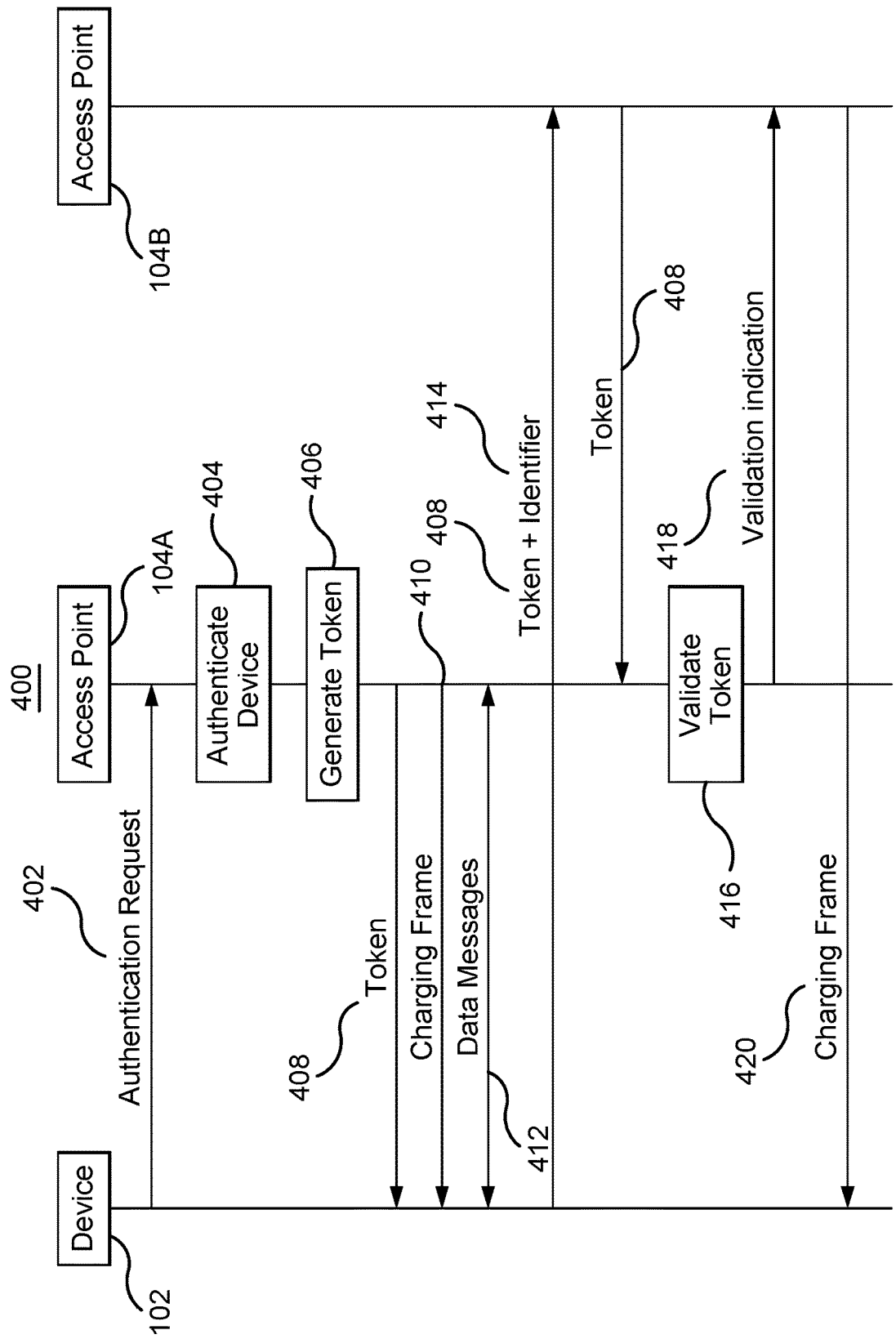
FIG. 4 illustrates an example method performed in the system of FIG. 1.

FIG. 4 illustrates an example method 400 performed in the system 100 of FIG. 1. In particular embodiments, the device 102, an access point 104A, and an access point 104B in the system 100 perform the method 400. By performing the method 400, the device 102 may receive and use a token to request wireless charging frames from any access point 104 in the system 100.

The device 102 may begin by communicating an authentication request 402 to the access point 104A. The authentication request 402 may include identifying credentials of the device 102. Additionally, the authentication request 402 may include security information (e.g., keys or passwords). The access point 104A may use the information in the authentication request 402 to authenticate or associate the device 102 in block 404. For example, the access point 104A may determine the identity of the device 102 and determine whether the device 102 is authorized to communicate with the access point 104A.

In block 406, after the access point 104A authenticates or associates the device 102, the access point 104A may generate a token 408. The token may include information that the device 102 may use to request wireless charging frames from other access points 104. For example, the access point 104A may generate the token 408 using the authentication information provided by the device 102 or other information exchanged with the device 102. In some embodiments, the token 408 may include encrypted information (e.g., a hash or other encrypted information) that the access point 104A may decrypt. The access point 104A communicates the token 408 to the device 102 after the token 408 is generated.

The access point 104A may also communicate charging frames 410 to the device 102. The device 102 may harvest or extract energy from the charging frames 410. The device 102 may store the energy in a capacitor 206 or battery 216 to power the operations of the device 102. The device 102 and the access point 104A may also exchange data messages 412. For example, the device 102 may communicate data messages to the access point 104A, and the access point 104A may communicate data messages 412 to the device 102. In some embodiments, the access point 104A may refrain from communicating charging frames 410 to the device 102 while the access point 104A is communicating data messages 412 to the device 102.

As the device 102 moves in the network, the device 102 may move closer to other access points 104 in the system 100. For example, the device 102 may move closer to the access point 104B. Due to the proximity of the device 102 to the access point 104B, it may be more efficient or it may improve communication for the device 102 to communicate with or through the access point 104B. In some instances, the device 102 may need to receive wireless charging frames from the access point 104B. The device 102 may provide the token 408 and an identifier 414 to the access point 104B. The identifier 414 may include identification information for the access point 104A. In this manner, the device 102 provides the token 408 and information that identifies the access point 104A that issued the token 408. The access point 104B may analyze the information in the identifier 414 to identify the access point 104A. The access point 104B may then communicate the token 408 to the access point 104A.

In block 416, the access point 104A validates the token 408. For example, the access point 104A may examine information in the token 408 to verify that the token 408 was the token 408 that the access point 104A previously issued to the device 102. In some embodiments, the access point 104A may decrypt the token 408, to verify the information in the token 408. After the access point 104A has validated the token 408 in block 416, the access point 104A communicates a validation indication 418 to the access point 104B. The validation indication 418 may indicate whether the token 408 is validated or not. The validation indication 418 may also include other information (e.g., power parameters negotiated between the device 102 and the access point 104A). If the validation indication 418 indicates that the token 408 is not validated, the access point 104B may refuse to communicate charging frames to the device 102. If the validation indication 418 indicates that the token 408 is validated, then the access point 104B begins communicating wireless charging frames 420 to the device 102. In this manner, the device 102 may request and receive charging frames 420 from other access points 104 in the system 100 without authenticating or associating with those access points 104.

In some embodiments, if the device 102 wishes to exchange data messages with the access point 104B, then the device 102 may authenticate or associate with the access point 104B by providing identifying credentials to the access point 104B, which serve as a request to start exchanging data messages. After the access point 104B authenticates or associates the device 102, the device 102 may exchange data messages with the access point 104B. The access point 104B may refrain from communicating charging frames 420 to the device 102 when the access point 104B is communicating data messages to the device 102.

In certain embodiments, the access point 104A and the access point 104B may coordinate the communication of charging frames 410 and 420 to the device 102. For example, the access points 104A and 104B may generate schedules that govern when the charging frames 410 and 420 are communicated to the device 102. The access points 104A and 104B may then communicate the charging frames 410 and 420 to the device 102 according to the schedules. The device 102 may listen for the charging frames 410 and 420 according to the schedules. In this manner, the device 102 may receive charging frames more frequently, and the access points 104A and 104B may share the load of providing charging frames to the device 102.

In some embodiments, the device 102 broadcasts the token 408 and the identifier 414 such that multiple access points 104 receive the token 408 and the identifier 414. Each of these access points 104 may validate the token 408 with the access point 104A identified in the identifier 414. These access points 104 may then provide charging frames to the device 102 in conjunction with each other.

Figure 5:
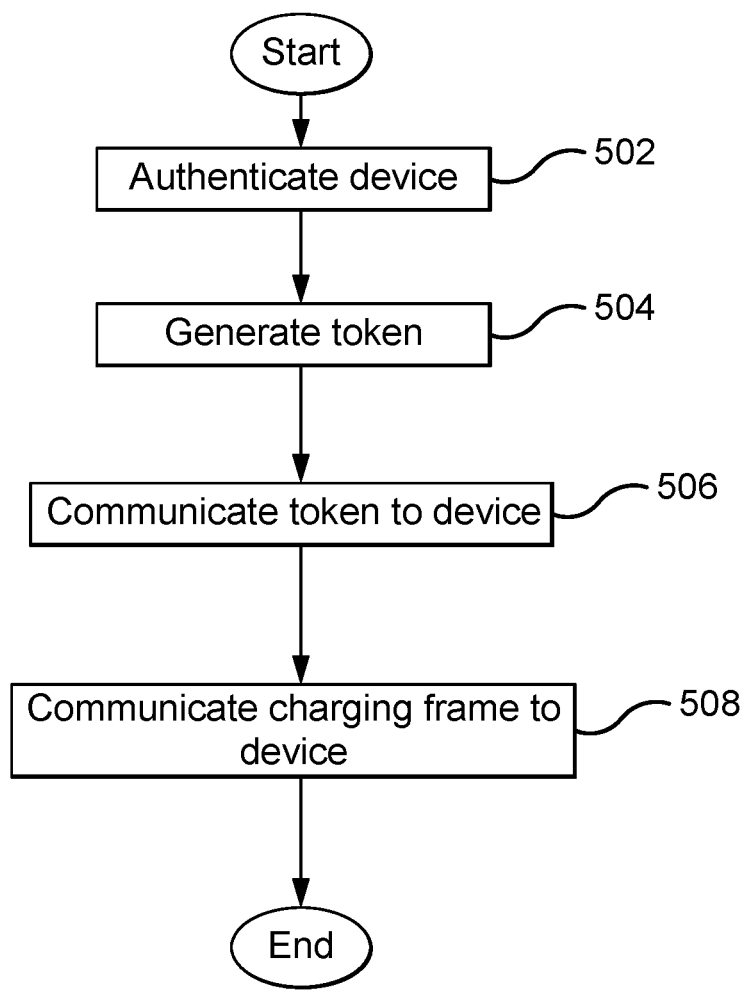
FIG. 5 is a flowchart of an example method performed in the system of FIG. 1.

FIG. 5 is a flowchart of an example method 500 performed in the system 100 of FIG. 1. In particular embodiments, the access point 104A may perform the method 500. By performing the method 500, the access point 104A authenticates or associates the device 102 and communicates charging frames 410 to the device 102.

In block 502, the access point 104A authenticates the device 102. The device 102 may have communicated the authentication request 402 to the access point 104A. The authentication request 402 may include identifying information for the device 102 along with authentication credentials (e.g., passwords or keys). The access point 104A may use the information in the authentication request 402 to authenticate or associate the device 102.

In block 504, the access point 104A generates the token 408. The token 408 may include encrypted information that the device 102 may subsequently use to request charging frames from other access points 104 in the system 100. The access point 104A may keep a record or log of the token 408 so that the access point 104A may subsequently validate the token 408. In block 506, the access point 104A communicates the token 408 to the device 102. The device 102 may store the token 408 for subsequent use.

In block 508, the access point 104A communicates charging frames 410 to the device 102. The device 102 may harvest or extract energy from the charging frames 410. The device 102 may then store the energy in a capacitor 206 or battery 216. The device 102 may then use this energy to power the operations of the device 102. In some embodiments, the access point 104A may also communicate data messages 412 to the device 102. The access point 104A may refrain from communicating the charging frames 410 while communicating the data messages 412.

Figure 6:
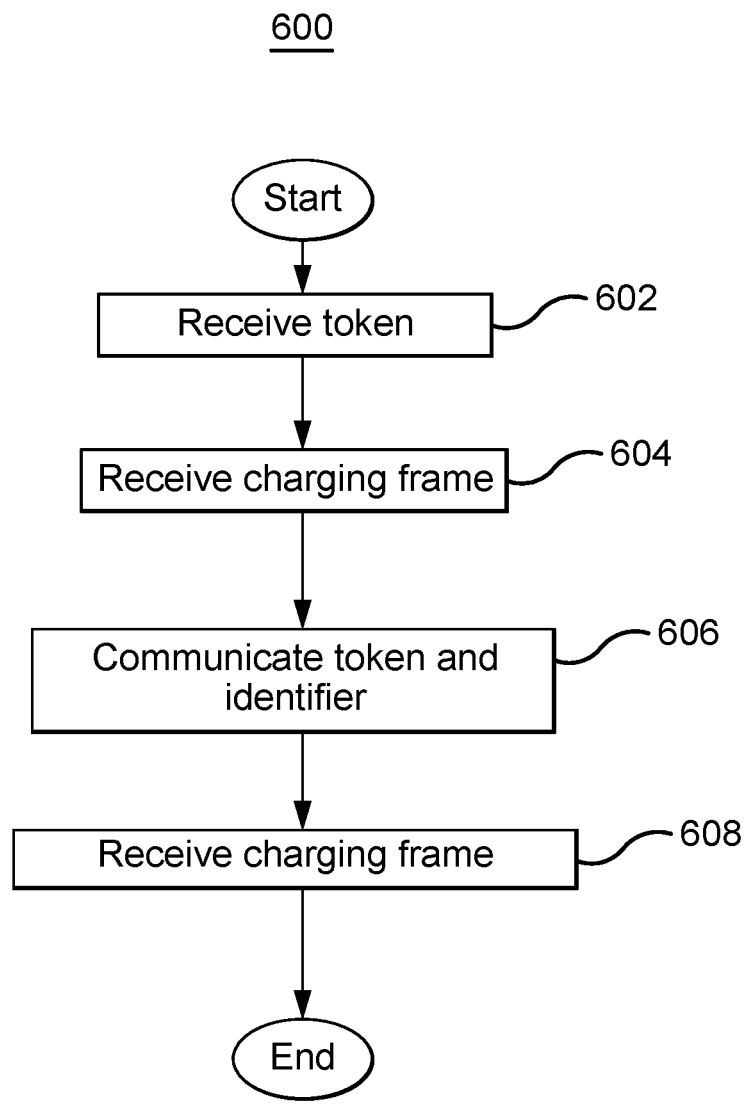
FIG. 6 is a flowchart of an example method performed in the system of FIG. 1.

FIG. 6 is a flowchart of an example method 600 performed in the system 100 of FIG. 1. In particular embodiments, the device 102 may perform the method 600. By performing the method 600, the device 102 may request charging frames from any access point 104 in the system 100.

In block 602, the device 102 receives the token 408 from the access point 104A. The device 102 may have received the token 408 after authenticating or associating with the access point 104A. The access point 104A may have generated the token 408 and provided the token 408 to the device 102 so that the device 102 may use the token 408 to request charging frames from other access points 104.

In block 604, the device 102 receives charging frames 410 from the access point 104A. The access point 104A may communicate the charging frames 410 to the device 102 after the device 102 has authenticated or associated with the access point 104A. The device 102 may harvest or extract energy from the charging frames 410. The device 102 may store that energy in the capacitor 206 or the battery 216. The device 102 may then use that energy to power the operations of the device 102.

The device 102 may move in the system 100 closer to other access points 104. For example, the device 102 may move closer to the access point 104B. As a result, it may be more efficient for the device 102 to receive charging frames from the access point 104B. In block 606, the device 102 provides the token 408 and the identifier 414 to the access point 104B. The identifier 414 may include information that identifies the access point 104A that issued the token 408. The access point 104B may use the information in the identifier 414 to validate the token 408 with the access point 104A. For example, the access point 104B may communicate the token 408 to the access point 104A. The access point 104A may validate the token 408 and communicate the validation indication 418 to the access point 104B. The access point 104B may then communicate charging frames 420 to the device 102. The device 102 may receive the charging frames 420 in block 608. The device 102 may harvest and extract energy from the charging frames 420. The device 102 may store that energy in the capacitor 206 or the battery 216. The device 102 may then use that energy to power the operations of the device 102.

Figure 7:
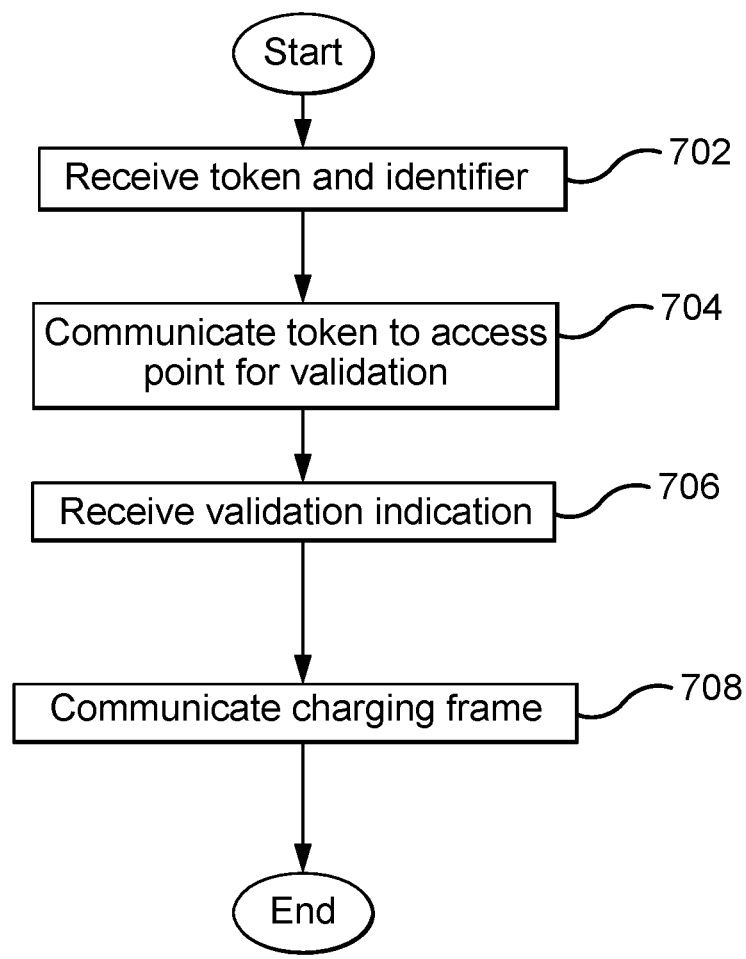
FIG. 7 is a flowchart of an example method performed in the system of FIG. 1.

FIG. 7 is a flowchart of an example method 700 performed in the system 100 of FIG. 1. In particular embodiments, the access point 104B performs the method 700. By performing the method 700, the access point 104B validates the token 408 with the access point 104A and communicates charging frames 420 to the device 102.

In block 702, the access point 104B receives the token 408 and the identifier 414 from the device 102. The token 408 and the identifier 414 may serve as a request for charging frames from the access point 104B. The identifier 414 may include information that identifies the access point 104A.

In block 704, the access point 104B communicates the token 408 to the access point 104A for validation. The access point 104A may examine the information in the token 408 to verify that the token 408 is the token 408 that the access point 104A previously issued to the device 102. After the access point 104A validates the token 408, the access point 104A communicates the validation indication 418 to the access point 104B. The access point 104B receives the validation indication 418 in block 706. The access point 104B may examine the information in the validation indication 418 to determine that the token 408 was validated. The access point 104B may then communicate charging frames 420 to the device 102 in block 708. The device 102 may harvest and store the energy in the charging frames 420. The device 102 may then use this energy to power the operations of the device 102. In this manner, the access point 104B provides charging frames 420 to the device 102 even though the device 102 has not authenticated or associated with the access point 104B.

Figure 8:
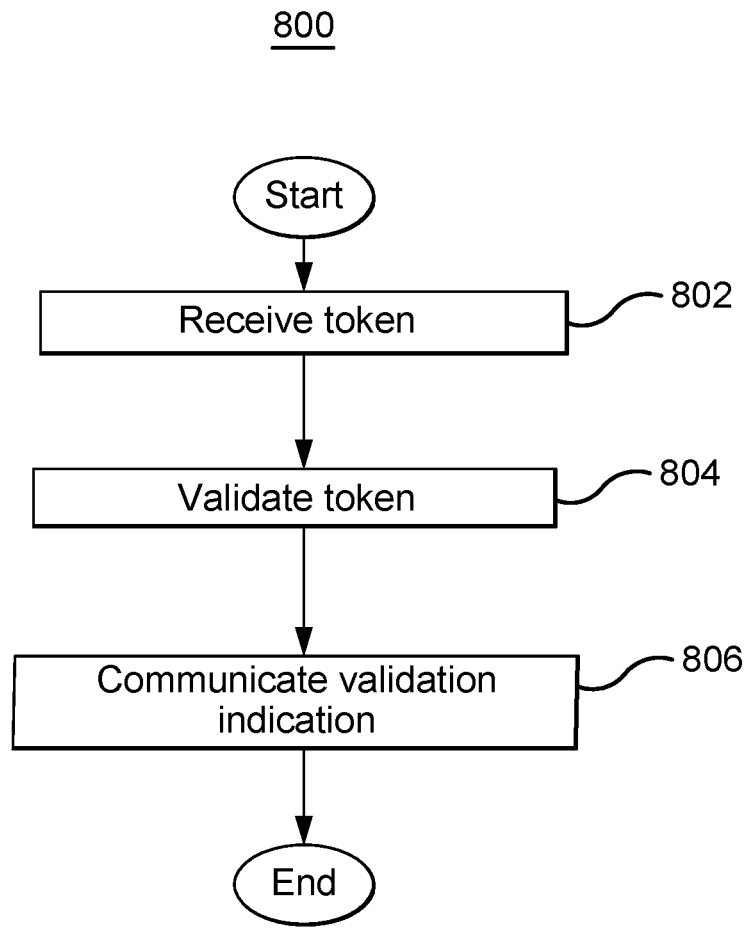
FIG. 8 is a flowchart of an example method performed in the system of FIG. 1.

FIG. 8 is a flowchart of an example method 800 performed in the system 100 of FIG. 1. In particular embodiments, the access point 104A performs the method 800. By performing the method 800, the access point 104A validates the token 408.

In block 802, the access point 104A receives the token 408 from the access point 104B. The token 408 may have been provided by the device 102 to the access point 104B. In block 804, the access point 104A validates the token 408. For example, the access point 104A may decrypt the token 408 and examine the information in the token 408 to validate the token 408. The access point 104A may determine whether the token 408 was the token 408 that the access point 104A previously issued to the device 102 when the device 102 authenticated or associated with the access point 104A. For example, the access point 104A may compare the information in the token 408 with logged information about the token 408 that was previously issued to the device 102.

In block 806, the access point 104A communicates the validation indication 418 to the access point 104B after the access point 104A validates the token 408. The validation indication 418 may include information that indicates whether the token 408 is validated or not. If the token 408 is validated, the access point 104B may begin communicating charging frames 420 to the device 102.

In summary, the system 100 implements a technique for secure energy harvesting. When a device 102 first authenticates with a first access point 104A in the network, the device 102 may also indicate to the first access point 104A that the device 102 can harvest energy from wireless signals. The first access point 104A may authenticate the device 102 and provide a token 408 to the device 102. When the device 102 roams to a second access point 104B in the network, the device 102 may communicate the token 408 to the second access point 104B along with an identifier 414 for the first access point 104A. The second access point 104B may communicate the token 408 to the first access point 104A for validation. The first access point 104A may validate the token 408 (e.g., confirm that the first access point 104A issued the token 408 to the device 102) and communicate a validation indication 418 to the second access point 104B. In response to receiving the validation indication 418, the second access point 104B may begin communicating charging frames to the device 102.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An access point comprising:
a memory; and
a processor communicatively coupled to the memory, the processor configured to:
receive, from a wireless device, a token and an identifier for a first access point that generated the token;
request the first access point to validate the token; and
in response to the first access point validating the token, wirelessly communicate a first charging frame to the wireless device.

2. The access point of claim 1, wherein the token was wirelessly communicated by the first access point to the wireless device in response to the wireless device wirelessly authenticating and connecting to the first access point.

3. The access point of claim 1, wherein a second access point receives the token from the wireless device, and wherein the second access point wirelessly communicates a second charging frame to the wireless device in conjunction with the first charging frame being communicated to the wireless device.

4. The access point of claim 1, wherein the processor is further configured to generate a schedule for the wireless device, and wherein the first charging frame is communicated to the wireless device according to the schedule.

5. The access point of claim 1, wherein the wireless device charges a battery or capacitor using energy from the first charging frame.

6. The access point of claim 1, wherein the token is received from the wireless device after the wireless device has roamed away from the first access point.

7. The access point of claim 1, wherein the processor is further configured to:
receive a request from the wireless device to start receiving data messages; and
wirelessly communicate data messages to the wireless device.

8. The access point of claim 7, wherein the processor is further configured to refrain from sending charging frames to the wireless device in response to receiving the request and while communicating data messages to the wireless device.

9. A method comprising:
receiving, from a wireless device, a token and an identifier for a first access point that generated the token;
requesting the first access point to validate the token; and
in response to the first access point validating the token, wirelessly communicating a first charging frame to the wireless device.

10. The method of claim 9, wherein the token was wirelessly communicated by the first access point to the wireless device in response to the wireless device wirelessly authenticating and connecting to the first access point.

11. The method of claim 9, wherein a second access point receives the token from the wireless device, and wherein the second access point wirelessly communicates a second charging frame to the wireless device in conjunction with the first charging frame being communicated to the wireless device.

12. The method of claim 9, further comprising generating a schedule for the wireless device, and wherein the first charging frame is communicated to the wireless device according to the schedule.

13. The method of claim 9, wherein the wireless device charges a battery or capacitor using energy from the first charging frame.

14. The method of claim 9, wherein the token is received from the wireless device after the wireless device has roamed away from the first access point.

15. The method of claim 9, further comprising:
receiving a request from the wireless device to start receiving data messages; and
wirelessly communicating data messages to the wireless device.

16. The method of claim 15, further comprising refraining from sending charging frames to the wireless device in response to receiving the request and while communicating data messages to the wireless device.

17. A system comprising:
a first access point arranged to:
wirelessly authenticate a wireless device; and
communicate a token to the wireless device in response to authenticating the wireless device; and
a second access point arranged to:
wirelessly receive the token from the wireless device;
communicate the token to the first access point; and
in response to the first access point validating the token, wirelessly communicate a charging frame to the wireless device.

18. The system of claim 17, wherein the first access point is further arranged to wirelessly communicate a charging frame to the wireless device after wirelessly authenticating the wireless device.

19. The system of claim 17, wherein the wireless device comprises:
a radio arranged to wirelessly receive the charging frame;
an energy harvester circuit arranged to extract energy from the charging frame; and
a battery arranged to store the extracted energy.

20. The system of claim 19, wherein the wireless device is arranged to use the energy stored in the battery to generate and wirelessly transmit a message.

\* \* \* \* \*